United States Patent
Tong

(10) Patent No.: US 12,515,280 B2
(45) Date of Patent: Jan. 6, 2026

(54) SURFACE TREATMENT METHOD FOR MAGNESIUM ALLOY HUB

(71) Applicant: CITIC Dicastal Co., Ltd., Qinhuangdao (CN)

(72) Inventor: Lin Tong, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 904 days.

(21) Appl. No.: 17/775,438

(22) PCT Filed: Oct. 16, 2020

(86) PCT No.: PCT/CN2020/121477
§ 371 (c)(1),
(2) Date: May 9, 2022

(87) PCT Pub. No.: WO2021/098420
PCT Pub. Date: May 27, 2021

(65) Prior Publication Data
US 2022/0402077 A1    Dec. 22, 2022

(30) Foreign Application Priority Data

Nov. 18, 2019 (CN) .......................... 201911130058.7

(51) Int. Cl.
*B23K 26/60* (2014.01)
*B23K 26/073* (2006.01)
(Continued)

(52) U.S. Cl.
CPC ............ *B23K 26/60* (2015.10); *B23K 26/073* (2013.01); *B23K 26/082* (2015.10);
(Continued)

(58) Field of Classification Search
CPC .... B23K 26/60; B23K 26/073; B23K 26/082; B23K 26/123; B23K 26/18; B23K 26/34;
(Continued)

(56) References Cited

U.S. PATENT DOCUMENTS

2006/0005390 A1* 1/2006 Wang ...................... C25D 7/00
29/894.36
2018/0010210 A1* 1/2018 Tan ........................... B08B 3/14
(Continued)

FOREIGN PATENT DOCUMENTS

CN    104789965 A  *  7/2015
CN    105063687 A  *  11/2015
(Continued)

OTHER PUBLICATIONS

Machine English translation of KR-20030025478-A (Year: 2003).*
(Continued)

*Primary Examiner* — Edward F Landrum
*Assistant Examiner* — Erwin J Wunderlich
(74) *Attorney, Agent, or Firm* — IPro, PLLC

(57) ABSTRACT

The invention provides a surface treatment method for a magnesium alloy hub. The process includes: cleaning a to-be-treated surface of the magnesium alloy hub; blackening the cleaned to-be-treated surface; and laser cladding the blackened to-be-treated surface, wherein a laser cladding mode is a synchronous powder feeding mode, and a coating material is chromium. According to the surface treatment method for the magnesium alloy hub, air holes can be avoided.

9 Claims, 1 Drawing Sheet

---

101 — Cleaning a to-be-treated surface of an magnesium alloy hub

102 — Blackening the cleaned to-be-treated surface

103 — Laser cladding the blackened to-be-treated surface, wherein a laser cladding mode is a synchronous powder feeding mode, and a coating material is chromium

(51) Int. Cl.

| | |
|---|---|
| *B23K 26/082* | (2014.01) |
| *B23K 26/12* | (2014.01) |
| *B23K 26/14* | (2014.01) |
| *B23K 26/18* | (2006.01) |
| *B23K 26/34* | (2014.01) |
| *B23K 26/342* | (2014.01) |
| *C23C 24/10* | (2006.01) |
| *C23G 5/00* | (2006.01) |
| *B23K 101/00* | (2006.01) |
| *B23K 103/08* | (2006.01) |

(52) U.S. Cl.
CPC ............ *B23K 26/123* (2013.01); *B23K 26/18* (2013.01); *B23K 26/34* (2013.01); *B23K 26/342* (2015.10); *C23C 24/106* (2013.01); *B23K 26/1437* (2015.10); *B23K 2101/006* (2018.08); *B23K 2103/15* (2018.08); *C23C 24/103* (2013.01); *C23G 5/00* (2013.01); *Y10T 29/49533* (2015.01)

(58) Field of Classification Search
CPC .............. B23K 26/342; B23K 26/1437; B23K 2101/006; B23K 2103/15; C23C 24/106; C23C 24/103; C23G 5/00; Y10T 29/49533
See application file for complete search history.

(56) References Cited

U.S. PATENT DOCUMENTS

| | | | |
|---|---|---|---|
| 2020/0130104 A1* | 4/2020 | E ................................ | C22F 1/02 |
| 2021/0197317 A1* | 7/2021 | Zhang ..................... | C23C 24/10 |
| 2022/0410252 A1* | 12/2022 | Huang ..................... | B21K 1/40 |

FOREIGN PATENT DOCUMENTS

| | | | | | |
|---|---|---|---|---|---|
| CN | 107012463 A | * | 8/2017 | ............. | C22C 19/03 |
| CN | 108130532 A | * | 6/2018 | ............... | C21D 1/09 |
| CN | 108842151 A | * | 11/2018 | ............. | C22C 19/03 |
| CN | 109234732 A | * | 1/2019 | | |
| CN | 110373559 A | * | 10/2019 | | |
| KR | 20030025478 A | * | 3/2003 | | |

OTHER PUBLICATIONS

Machine English translation of CN-104789965-A (Year: 2015).*
Machine English translation of CN-105063687-A (Year: 2015).*
Machine English translation of CN-107012463-A (Year: 2017).*
Machine English translation of CN-108842151-A (Year: 2018).*
Machine English translation of CN-108130532-A (Year: 2018).*
Machine English translation of CN-109234732-A (Year: 2019).*
Machine English translation of CN-110373559-A (Year: 2019).*

* cited by examiner

SURFACE TREATMENT METHOD FOR MAGNESIUM ALLOY HUB

TECHNICAL FIELD

The invention relates to metal surface treatment, in particular to a surface treatment method for a magnesium alloy hub.

BACKGROUND

Laser cladding is also called as laser coating or laser depositing, and is a novel surface modification technology. A cladding material is added to the surface of a base material, and the cladding material and a thin layer on the surface of the base material are fused together through a high-energy-density laser beam, so that an additive cladding layer which is metallurgically bonded with the base layer is formed on the surface of a base layer. Compared with coating, electroplating, chemical plating, vacuum coating and vapor deposition, laser cladding has higher hardness, wear resistance and corrosion resistance and further has advantages of being low in cost and more environmentally friendly.

Therefore, in surface treatment of a magnesium alloy hub of a vehicle, the laser cladding technology is also adopted, however, the existing laser cladding technology of the magnesium alloy hub of the vehicle is not mature enough, and pores are easy to appear in the hub after the surface treatment.

SUMMARY

In view of this, embodiments of the invention aim to provide a surface treatment method for a magnesium alloy hub, so that air holes are avoided.

In order to achieve the purpose, the embodiments of the invention provide a surface treatment method for a magnesium alloy hub, including the following steps of: cleaning a to-be-treated surface of the magnesium alloy hub; blackening the cleaned to-be-treated surface; and laser cladding the blackened to-be-treated surface, wherein a laser cladding mode is a synchronous powder feeding mode, and a coating material is chromium.

In the above solution, cleaning the to-be-treated surface of the magnesium alloy hub includes: cleaning the to-be-treated surface with water; cleaning the to-be-treated surface by using ultrasonic waves; and polishing the to-be-treated surface through sand grains to remove oxide skin on the to-be-treated surface.

In the above solution, cleaning the to-be-treated surface with water includes: performing immersion cleaning on the to-be-treated surface with alkaline water for 6-8 min; and cleaning the to-be-treated surface with pure water.

In the above solution, cleaning the to-be-treated surface by using the ultrasonic waves includes: placing the magnesium alloy hub in alcohol, and then placing in an ultrasonic cleaning machine for cleaning the to-be-treated surface for 5 min; and blow-drying the to-be-treated surface with hot air.

In the above solution, polishing the to-be-treated surface through the sand grains to remove the oxide skin on the to-be-treated surface includes: spraying water and sand grains through water sand blasting equipment, and polishing the to-be-treated surface through the sand grains.

In the above solution, laser cladding the blackened to-be-treated surface includes: laser cladding the to-be-treated surface under the protection of helium.

In the above solution, laser cladding the to-be-treated surface under the protection of helium includes: placing the magnesium alloy hub in a protection box filled with helium; and spraying and blowing helium to the to-be-treated surface through a blowing device while laser scanning the to-be-treated surface, wherein an included angle between airflow and the to-be-treated surface is 55-62 degrees, and a gas flow rate is 12 L/min.

In the above solution, laser cladding the blackened to-be-treated surface includes: performing laser cladding with a fiber laser, wherein a laser power is 2-4 kW, a spot diameter is 4 mm, and a linear speed of laser scanning is 18-25 mm/min.

In the above solution, laser cladding the blackened to-be-treated surface includes: enabling the powder feeding amount of the coating material to be 5-15 g/s in the laser cladding process.

In the above solution, laser cladding the blackened to-be-treated surface includes: enabling a lap joint rate of laser cladding to be 80%.

The embodiments of the invention provide the surface treatment method for the magnesium alloy hub. The method includes the steps that the to-be-treated surface of the magnesium alloy hub is cleaned; the cleaned to-be-treated surface is blackened; and the blackened to-be-treated surface is subjected to laser cladding, wherein the laser cladding mode is a synchronous powder feeding mode, and a coating material is chromium; therefore, according to the surface treatment method for the magnesium alloy hub provided by the embodiments of the invention, chromium is selected as the coating material according to a material of a magnesium alloy, and air holes can be avoided through the synchronous powder feeding mode.

Other beneficial effects of the embodiments of the invention are further described in combination with the specific technical solutions in the specific embodiments.

DETAILED DESCRIPTION

Figure 1:
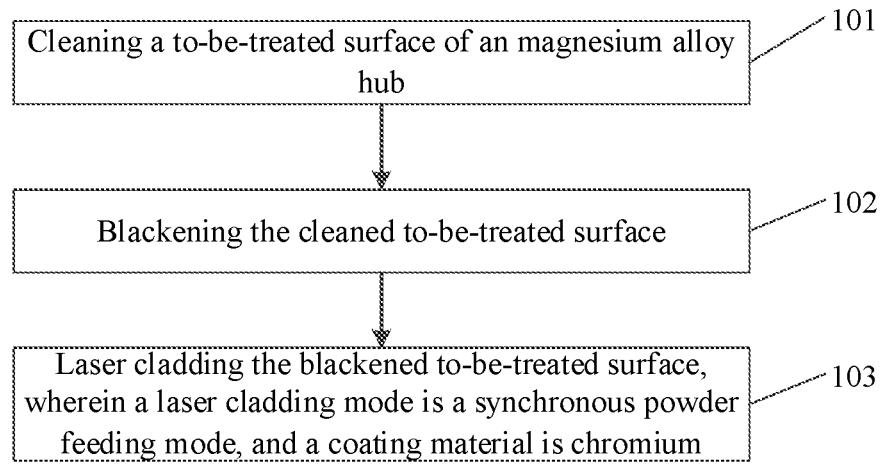
FIG. 1 is a flow schematic diagram of a surface treatment method for an magnesium alloy hub according to the embodiments of the invention.

The embodiments of the invention provide a surface treatment method for a magnesium alloy hub. The method includes the following steps of: cleaning a to-be-treated surface of the magnesium alloy hub; blackening the cleaned to-be-treated surface; and laser cladding the blackened to-be-treated surface, wherein a laser cladding mode is a synchronous powder feeding mode, and a coating material is chromium.

According to the surface treatment method for the magnesium alloy hub provided by the embodiments of the invention, chromium is selected as a coating material according to a material of a magnesium alloy, and air holes can be avoided through a synchronous powder feeding mode.

In other embodiments of the invention, cleaning the to-be-treated surface of the magnesium alloy hub may include: cleaning the to-be-treated surface with water; cleaning the to-be-treated surface by using ultrasonic waves; and polishing the to-be-treated surface through sand grains to remove oxide skin on the to-be-treated surface. In this way, cleaning is more thorough, the to-be-treated surface is smoother, a laser cladding effect is better, and a better mode is achieved.

In other embodiments of the invention, cleaning the to-be-treated surface with water may include: performing immersion cleaning on the to-be-treated surface with alkaline water for 6-8 min; and cleaning the to-be-treated surface with pure water. In this way, oil stains can be better removed, a laser cladding effect is better, and a better mode is achieved.

In other embodiments of the invention, cleaning the to-be-treated surface by using ultrasonic waves may include: placing the magnesium alloy hub in alcohol, and then placing in an ultrasonic cleaning machine for cleaning the to-be-treated surface for 5 min; and blow-drying the to-be-treated surface with hot air. In this way, oil stains on the to-be-treated surface can be further removed, and residual alkaline water can also be removed.

In other embodiments of the present invention, polishing the to-be-treated surface through the sand grains to remove the oxide skin on the to-be-treated surface may include: spraying water and sand grains through water sand blasting equipment, and polishing the to-be-treated surface through the sand grains. In this way, the oxide skin on the to-be-treated surface can be removed, a laser cladding effect is better, the oxide skin can be removed and cleaned at the same time in a water spraying mode, and efficiency is higher.

In other embodiments of the invention, laser cladding the blackened to-be-treated surface may include: laser cladding the to-be-treated surface under the protection of helium. In this way, oxidation and combustion of the magnesium alloy possibly generated in the laser scanning process can be prevented, and a better mode is achieved.

In other embodiments of the invention, laser cladding the to-be-treated surface under the protection of helium may include: placing the magnesium alloy hub in a protection box filled with helium; and spraying and blowing helium to the to-be-treated surface through a blowing device while laser scanning the to-be-treated surface, wherein an included angle between airflow and the to-be-treated surface is 55-62 degrees, and a gas flow rate is 12 L/min. In this way, protection is more comprehensive, no influence is caused to laser cladding, and a better mode is achieved.

In other embodiments of the invention, laser cladding the blackened to-be-treated surface may includes: performing laser cladding with a fiber laser, wherein a laser power is 2-4 kW, a spot diameter is 4 mm, and a linear speed of laser scanning is 18-25 mm/min. In this way, the coating material can be fully melted, the base material cannot generate excessive residual stress, a dilution rate is low, cracks are avoided, and a better mode is achieved.

In other embodiments of the invention, laser cladding the blackened to-be-treated surface may includes: enabling the powder feeding amount of the coating material to be 5-15 g/s in the laser cladding process. As mentioned above, this can also play the roles: the coating material can be fully melted, the base material cannot generate excessive residual stress, the dilution rate is low, and cracks are avoided. The powder feeding amount of the coating material has a certain corresponding relationship with the laser power, the spot diameter and the linear speed of laser scanning, however, through multiple tests, as long as the above process parameters are within the above range, its laser cladding effect meets the requirement.

In other embodiments of the invention, laser cladding the blackened to-be-treated surface may includes: enabling a lap joint rate of laser cladding to be 80%. In this way, surface roughness after laser cladding is better, and a better mode is achieved.

The detailed technical solution of the invention is described in combination with accompanying drawings and specific embodiments, and it should be understood that the accompanying drawings and embodiments are only used for explaining the invention and are not used for limiting the invention.

Embodiment 1

This embodiment provides a laser cladding method for a magnesium alloy hub, as shown in FIG. 1, the method includes:

Step 101, a to-be-treated surface of the magnesium alloy hub is cleaned;

Step 102, the cleaned to-be-treated surface is blackened; and

Step 103, the blackened to-be-treated surface is subjected to laser cladding, wherein a laser cladding mode is a synchronous powder feeding mode, and a coating material is chromium.

Figure 2:
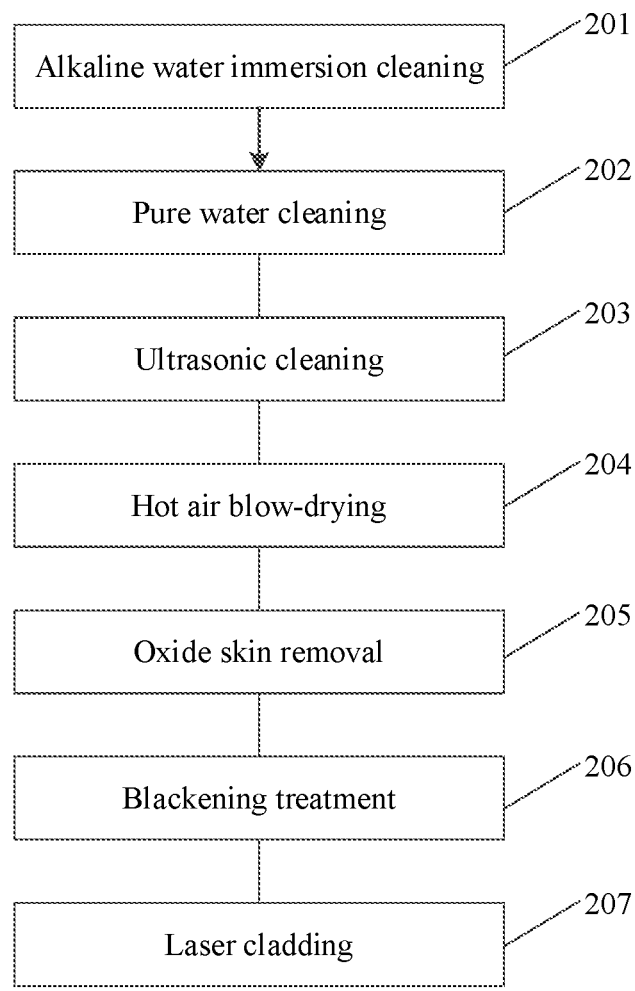
FIG. 2 is a more specific flow schematic diagram of a surface treatment method for a magnesium alloy hub according to the embodiments of the invention.

When the method is specifically implemented, a more specific process is provided, as shown in FIG. 2:

Step 201, immersion cleaning is performed with alkaline water. The to-be-treated surface is subjected to immersion cleaning with alkaline water for 6 min.

Step 202, cleaning is performed with pure water. The to-be-treated surface is cleaned with pure water for multiple times, wherein the pure water is common water and is different from the alkaline water.

Step 203, ultrasonic cleaning is conducted. The magnesium alloy hub is placed in alcohol and then placed in an ultrasonic cleaning machine for cleaning the to-be-treated surface for 5 min.

Step 204, blow-drying is performed with hot air. The to-be-treated surface is blow-dried with hot air, and is generally blow-dried by a hot-air blower.

Step 205, oxide skin is removed. Water and sand grains are sprayed out through water sand blasting equipment, and the to-be-treated surface is polished through the sand grains to remove the oxide skin for further cleaning.

Step 206, blackening treatment is performed. The cleaned to-be-treated surface is blackened, and the blackening treatment is beneficial to improving a laser absorption rate, so that the laser cladding efficiency is higher, and more energy is saved. A raw material for blackening treatment is carbon ink or a colloidal graphite solution, and a blackening mode is that the raw material is attached to the to-be-treated surface through a brushing or spraying method.

Step 207, laser cladding is conducted. Firstly, the blackened magnesium alloy hub is placed in a protection box filled with helium, then laser scanning is conducted on the to-be-treated surface, powder is synchronously fed, and in other words, chromium powder is sprayed to the to-be-treated surface while laser scanning is conducted. The process parameters of laser cladding include a laser power of 2 KW, a spot diameter of 4 mm, a laser scanning speed of 20 mm/min, the powder feeding amount of 9 g/s and a lap joint rate of 80%.

In order to further prevent possible oxidation and combustion of the magnesium alloy, except that the protection box is filled with helium, helium needs to be blown to a laser scanning position, an included angle between airflow and the to-be-treated surface is 58 degrees, and a gas flow rate is 12 L/min.

The magnesium alloy hub treated by the above steps may achieve the following performance:
1) bonding strength: the bonding strength of a laser cladding layer and a matrix can reach 450 MPa or above.
2) porosity: the porosity is 0.5%.
3) dilution rate: a dilution rate is 1.5% or below.
4) corrosion resistance: a copper accelerated acetic acid salt spray (CASS) test is carried out for more than 168 h.

Embodiment 2

A part of the technological process content in this embodiment is different from that in Embodiment 1, other contents are the same as those in Embodiment 1, only the different contents of this part are introduced below, and the flow schematic diagram is not shown additionally.

In this embodiment, in the step 207, the process parameters of laser cladding include a laser power of 2 KW, a spot diameter of 4 mm, a laser scanning speed of 22 mm/min, the powder feeding amount of 8 g/s, and a lap joint rate of 80%. An included angle between airflow and the to-be-treated surface is 60 degrees, and a gas flow rate is 12 L/min.

Embodiment 3

A part of the technological process content in this embodiment is different from that in Embodiment 1, other contents are the same as those in Embodiment 1, only the different contents of this part are introduced below, and the flow schematic diagram is not shown additionally.

In this embodiment, in the step 201, immersion cleaning is conducted for 8 min.

In the step 207, the process parameters of laser cladding includes a laser power of 3 KW, a spot diameter of 4 mm, a laser scanning speed of 25 mm/min, the powder feeding amount of 12 g/s and a lap joint rate of 80%. An included angle between airflow and the to-be-treated surface is 58 degrees, and a gas flow rate is 12 L/min.

Embodiment 4

A part of the technological process content in this embodiment is different from that in Embodiment 1, other contents are the same as those in Embodiment 1, only the different contents of this part are introduced below, and the flow schematic diagram is not shown additionally.

In this embodiment, in the step 201, immersion cleaning is conducted for 8 min.

In the step 207, the process parameters of laser cladding includes a laser power of 4 KW, a spot diameter of 4 mm, a laser scanning speed of 19 mm/min, the powder feeding amount of 10 g/s and a lap joint rate of 80%. An included angle between airflow and the to-be-treated surface is 60 degrees, and a gas flow rate is 12 L/min.

Embodiment 5

A part of the technological process content in this embodiment is different from that in Embodiment 1, other contents are the same as those in Embodiment 1, only the different contents of this part are introduced below, and the flow schematic diagram is not shown additionally.

In this embodiment, in the step 201, immersion cleaning is conducted for 7 min.

In the step 207, the process parameters of laser cladding includes a laser power of 3.5 KW, a spot diameter of 4 mm, a laser scanning speed of 18 mm/min, the powder feeding amount of 15 g/s and a lap joint rate of 80%. An included angle between airflow and the to-be-treated surface is 55 degrees, and a gas flow rate is 12 L/min.

Embodiment 6

A part of the technological process content in this embodiment is different from that in Embodiment 1, other contents are the same as those in Embodiment 1, only the different contents of this part are introduced below, and the flow schematic diagram is not shown additionally.

In this embodiment, in the step 201, immersion cleaning is conducted for 8 min.

In the step 207, the process parameters of laser cladding includes a laser power of 2.5 KW, a spot diameter of 4 mm, a laser scanning speed of 23 mm/min, the powder feeding amount of 5 g/s and a lap joint rate of 80%. An included angle between airflow and the to-be-treated surface is 62 degrees, and a gas flow rate is 12 L/min.

Embodiment 7

A part of the technological process content in this embodiment is different from that in Embodiment 1, other contents are the same as those in Embodiment 1, only the different contents of this part are introduced below, and the flow schematic diagram is not shown additionally.

In this embodiment, in the step 201, immersion cleaning is conducted for 7 min.

In the step 207, the process parameters of laser cladding includes a laser power of 3 KW, a spot diameter of 4 mm, a laser scanning speed of 21 mm/min, the powder feeding amount of 11 g/s and a lap joint rate of 80%. An included angle between airflow and the to-be-treated surface is 56 degrees, and a gas flow rate is 12 L/min.

Embodiment 8

A part of the technological process content in this embodiment is different from that in Embodiment 1, other contents are the same as those in Embodiment 1, only the different contents of this part are introduced below, and the flow schematic diagram is not shown additionally.

In the step 207, the process parameters of laser cladding includes a laser power of 3.5 KW, a spot diameter of 4 mm, a laser scanning speed of 22 mm/min, the powder feeding amount of 10 g/s and a lap joint rate of 80%. An included angle between airflow and the to-be-treated surface is 58 degrees, and a gas flow rate is 12 L/min.

Compared with a magnesium alloy hub subjected to electroplating treatment, the magnesium alloy hub subjected to laser cladding has higher hardness, wear resistance and corrosion resistance, in order to verify the magnesium alloy hub subjected to laser cladding, the magnesium alloy hub in the above embodiments and the electroplated magnesium alloy hub are subjected to a corrosion resistance test together, and the specific result is as follows:

Test name: copper accelerated acetic acid salt spray (CASS) test;

Sodium chloride content: 50±5 g/l
pH value: 3.1-3.3
Temperature: 50±2° C.
Salt spraying amount: 1.0-2.0 ml/h
CuCl2·2H2O content: 0.26±0.02 g/l
Test time: 66 h/120 h/168 h
Detection standard: GMW15774
Test results are as shown in table 1:

TABLE 1

| Test article | 66 h | 120 h | 168 h | Result |
| --- | --- | --- | --- | --- |
| Embodiment 1 | No corrosion | No change | No significant change | Intactness |
| Embodiment 2 | No corrosion | No change | No significant change | Intactness |
| Embodiment 3 | No corrosion | No change | No significant change | Intactness |
| Embodiment 4 | No corrosion | No change | No significant change | Intactness |
| Embodiment 5 | No corrosion | No change | No significant change | Intactness |
| Embodiment 6 | No corrosion | No change | No significant change | Intactness |
| Embodiment 7 | No corrosion | No change | No significant change | Intactness |
| Embodiment 8 | No corrosion | No change | No significant change | Intactness |
| Electroplated product | No corrosion | No significant change | Visible corrosion spot | Failure |

In the description of the embodiments of the invention, unless otherwise specified and limited, the term 'connection' should be understood in a broad sense, for example, connection may be electric connection, internal communication of two elements, direct connection or indirect connection through an intermediate medium, and for those of ordinary skill in the art, specific meanings of the above term can be understood according to specific conditions.

In the embodiments of the invention, If the term "first\second\third" is involved, it is only used for distinguishing similar objects and does not represent a specific sequence for the objects, and understandably, the term "first\second\third" can be interchanged in a specific order or sequence if allowed.

It should be understood that "one embodiment" or "some embodiments" mentioned throughout the description means that specific features, structures or characteristics related to the embodiments are included in at least one embodiment of the invention. Thus, "in one embodiment" or "in some embodiments" appearing throughout the description does not necessarily refer to the same embodiment. In addition, these specific features, structures, or characteristics may be incorporated in one or more embodiments in any suitable manner. It should be understood that in various embodiments of the invention, the size of the sequence numbers of the above processes does not mean an execution sequence, the execution sequence of each process should be determined by its function and internal logic, and should not constitute any limitation on the implementation process of the embodiments of the invention. The serial numbers of the embodiments of the invention are only used for describing and do not represent the advantages and disadvantages of the embodiments.

The above is only a specific description of better embodiments of the invention and is not used for limiting the protection range of the invention, and any other equivalent transformation should belong to the protection range of the invention.

The invention claimed is:

1. A surface treatment method for a magnesium alloy hub, characterized by comprising the following steps of:
   cleaning a to-be-treated surface of the magnesium alloy hub;
   blackening the cleaned to-be-treated surface; and
   laser cladding the blackened to-be-treated surface in a laser cladding mode and with a coating material, wherein the laser cladding mode is a synchronous powder feeding mode, and the coating material is chromium,
   wherein the laser cladding the blackened to-be-treated surface comprises:
   performing laser cladding with a fiber laser, wherein a laser power is 2-4 kW, a spot diameter is 4 mm, and a linear speed of laser scanning is 18-25 mm/min.

2. The method according to claim 1, characterized in that cleaning the to-be-treated surface of the magnesium alloy hub comprises:
   cleaning the to-be-treated surface with water;
   cleaning the to-be-treated surface by using ultrasonic waves; and
   polishing the to-be-treated surface through sand grains to remove oxide skin on the to-be-treated surface.

3. The method according to claim 2, characterized in that cleaning the to-be-treated surface with water comprises:
   performing immersion cleaning on the to-be-treated surface with alkaline water for 6-8 min; and
   cleaning the to-be-treated surface with pure water.

4. The method according to claim 2, characterized in that cleaning the to-be-treated surface by using the ultrasonic waves comprises:
   placing the magnesium alloy hub in alcohol, and then cleaning the to-be-treated surface by using ultrasonic waves for 5 min; and
   blow-drying the to-be-treated surface with hot air.

5. The method according to claim 2, characterized in that polishing the to-be-treated surface through the sand grains to remove the oxide skin on the to-be-treated surface comprises:
   polishing the to-be-treated surface through the sand grains by spraying water and sand grains.

6. The method according to claim 1, characterized in that laser cladding the blackened to-be-treated surface comprises:
   laser cladding the to-be-treated surface under the protection of helium.

7. The method according to claim 6, characterized in that laser cladding the to-be-treated surface under the protection of helium comprises:
   placing the magnesium alloy hub in a protection box filled with helium; and
   spraying and blowing helium to the to-be-treated surface while laser scanning the to-be-treated surface, wherein an included angle between airflow and the to-be-treated surface is 55-62 degrees, and a gas flow rate is 12 L/min.

8. The method according to claim 1, characterized in that:
   the powder feeding mode of the coating material is performed at 5-15 g/s in the laser cladding process.

9. The method according to claim 1, characterized in that:
   the laser cladding mode is performed at a lap joint rate of 80%.

* * * * *